US006321278B1

United States Patent
Phu et al.

(10) Patent No.: US 6,321,278 B1
(45) Date of Patent: Nov. 20, 2001

(54) AUTOMATICALLY DETECTING A CONNECTION INTO A COMPUTER SYSTEM STANDARDIZED CONNECTOR FOR DISABLING A FRONT SPEAKER

(75) Inventors: Hung Q. Phu, Friendswood; David L. Collins, Magnolia, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/152,710

(22) Filed: Sep. 14, 1998

(51) Int. Cl.[7] .............................. G06F 3/00; H04B 3/00; H04R 27/00
(52) U.S. Cl. .............................. 710/14; 710/18; 381/81; 381/85
(58) Field of Search .......................... 381/81, 85; 710/14, 710/2, 18, 36, 38, 73

(56) References Cited

U.S. PATENT DOCUMENTS

| 4,400,581 | 8/1983 | Jacobson | 179/1 |
| 5,056,148 | 10/1991 | Hayashi | 381/11 |
| 5,246,378 | 9/1993 | Seiceanu | 439/188 |
| 5,655,025 | 8/1997 | Kim et al. | 381/11 |
| 5,701,347 | * 12/1997 | Daniels et al. | 381/24 |
| 5,764,512 | * 6/1998 | Michel et al. | 364/400.01 |
| 5,822,406 | 10/1998 | Brown | 379/88 |
| 5,832,438 | * 11/1998 | Bauer | 704/270 |
| 5,854,736 | * 12/1998 | Fuhs et al. | 361/683 |
| 5,910,991 | * 6/1999 | Farrar | 381/59 |
| 6,126,332 | * 10/2000 | Cubbage et al. | 395/822 |

* cited by examiner

Primary Examiner—Thomas Lee
Assistant Examiner—Chun Cao
(74) Attorney, Agent, or Firm—Akin, Gump, Strauss, Hauer & Feld, LLP (57) ABSTRACT

A computer system audio circuit is connected to a sound device, a combination game/MIDI/line-in/line-out/headphone jack, and internal loudspeaker. The circuit routes audio signals to a headphone, when the headphones are plugged into the headphone connector of the combination jack. In addition, the audio circuit switches and does not route audio signal to the internal loudspeaker nor external loudspeakers when the headphones are plugged in. Furthermore, if the external loudspeakers are plugged into the line-out connector of the combination jack, the circuit provides audio to the external loudspeakers but not the internal loudspeaker.

23 Claims, 7 Drawing Sheets

AUTOMATICALLY DETECTING A CONNECTION INTO A COMPUTER SYSTEM STANDARDIZED CONNECTOR FOR DISABLING A FRONT SPEAKER

BACKGROUND OF THE INVENTION

1. Field of the Invention

The present invention relates to computer systems, and more specifically, to providing an audio signal to headphones, internal loudspeakers or external loudspeakers using a combination jack.

2. Description of the Related Art

Multimedia capabilities are an important feature in today's computer system. As processor capabilities are improving in each generation of new computer systems, so are the needs for providing sights and sounds to the user.

Today's computer systems from the personal computer to workstations run the gamut of software applications. Software applications such as games, word processing, finance, computer aided design (CAD) and communications may be installed on one computer. Thus, users demand hi-resolution graphics display and/or high quality sound reproduction capabilities for these applications.

To meet the demands, computer manufacturers are building larger monitors, better video controllers, and improved sound devices. The sound devices provide electrical signals to headphones or loudspeakers for sound reproduction. Furthermore, the computer system may allow users to listen to sounds either with headphones, internal loudspeakers, or external loudspeakers.

Typically, sounds are reproduced by the internal loudspeaker. However, for personal listening, a user may plug the headphones into the computer system headphone jack. Typically, computer systems have switching circuitry which disables the internal loudspeakers when a headphone plug is inserted into the headphone jack. Thus, the user may enjoy the sounds and not disturb others via the internal loudspeakers.

Furthermore, if the user plugs the external loudspeakers into the line-out jack of the computer system, the computer system's switching circuitry disables the internal loudspeakers. External loudspeakers typically provide better audio performance than internal speakers. Therefore, to prevent interference with the external loudspeakers, the switching circuitry disables the internal loudspeakers.

Typical computer systems use many different jacks for accepting a wide range of input/output (I/O) devices, such as a headphone, external loudspeaker, a joystick, and a MIDI device, such as a musical keyboard. Some prior jacks have included switching circuitry. The switch would be in a particular position based on whether a plug is inserted or not inserted into the jack. These jacks allow engineers to design circuits for routing audio signals to an output, based on whether a plug is inserted into a particular jack. The jacks typically provide enabling signals based on whether a plug is inserted. Recently, a combination jack, incorporating the different jacks in a single package for the different I/O's, has begun to be used in an attempt to provide a low cost standard for the industry.

However, the combination jack does not provide the audio enabling/disabling capabilities. Therefore, computer design is faced with two conflicting concerns. A jack with switching capability, but not compatible with the combination jack could be used to allow the routing of audio signals to a headphone internal loudspeakers or external loudspeakers under varying use conditions. However, this type of jack is not in conformance with the desired features of the combination jack.

SUMMARY OF THE INVENTION

According to the present invention, a computer system audio circuit is provided to route audio signals to various audio transducers of a computer system, such as an internal loudspeaker, headphone or external loudspeakers. To avoid interference, the internal loudspeaker of the computer system is disconnected when either the headphone or external loudspeakers are connected into their respective audio jacks. Otherwise, audio emanates from the internal loudspeaker.

The audio circuit is connected to a combination game/musical instrument digital interface (MIDI)/line-in/line-out/headphone jack. When a headphone is connected to the headphone jack, the jack disconnects an audio left and right signal from a sound device of the computer system to its internal loudspeaker. Further, when the external loudspeakers are connected to the combination jack, the audio circuit disconnects the audio left and right signal from the sound device to the internal loudspeaker.

Also, according to the present invention, a circuit provides an out of band (ultrasonic) signal through the combination jack to an out of band detector switch. When a plug is not inserted to the jack, the out of band detector switch senses the ultrasonic signal and couples a sound device to an internal loudspeaker. When a plug is inserted into the jack, the jack decouples the ultrasonic signal and out of band detector switch. The detector switch then decouples the soundcard and internal loudspeaker.

Further, according to the invention, the audio circuit is impervious to load impedances. Thus, the circuit can accommodate and drive transducers with typical variable impedances ranging from 100K to 500K ohms.

DETAILED DESCRIPTION OF INVENTION

Figure 1A:
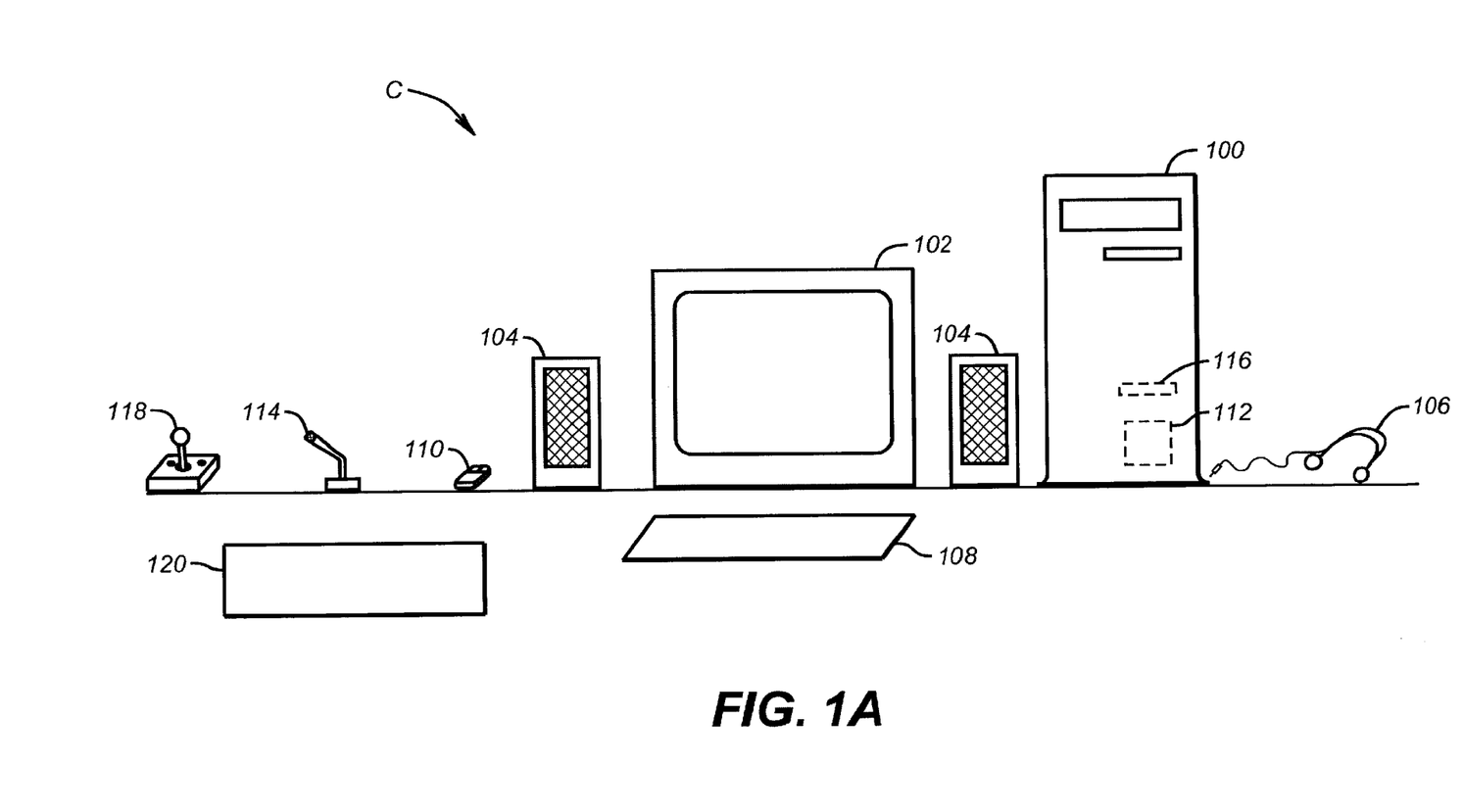
FIG. 1A is a front elevation view of a computer system according to the present invention.

FIG. 1A is a front elevation view of a typical computer system C in which the present invention is based. Typical computer systems include a CPU (central processing unit) 100 which houses components for data processing. Computer system C also includes a monitor 102 connected to the CPU 100 for displaying images to a user. Various input devices such as a keyboard 108, a mouse 110, a microphone 114, a joystick 118 and a MIDI device 120 are also connected to the CPU 100. Of course, other input devices such as a scanner, MIDI device, or a digital camera could be connected to CPU 100. For sound reproduction, various transducers may be connected to the CPU 100. Typical CPU 100 includes an internal speaker 112. Other transducers for reproducing sound that can be connected to the CPU 100 are a headphone 106 and external loudspeakers 104.

Figure 1B:
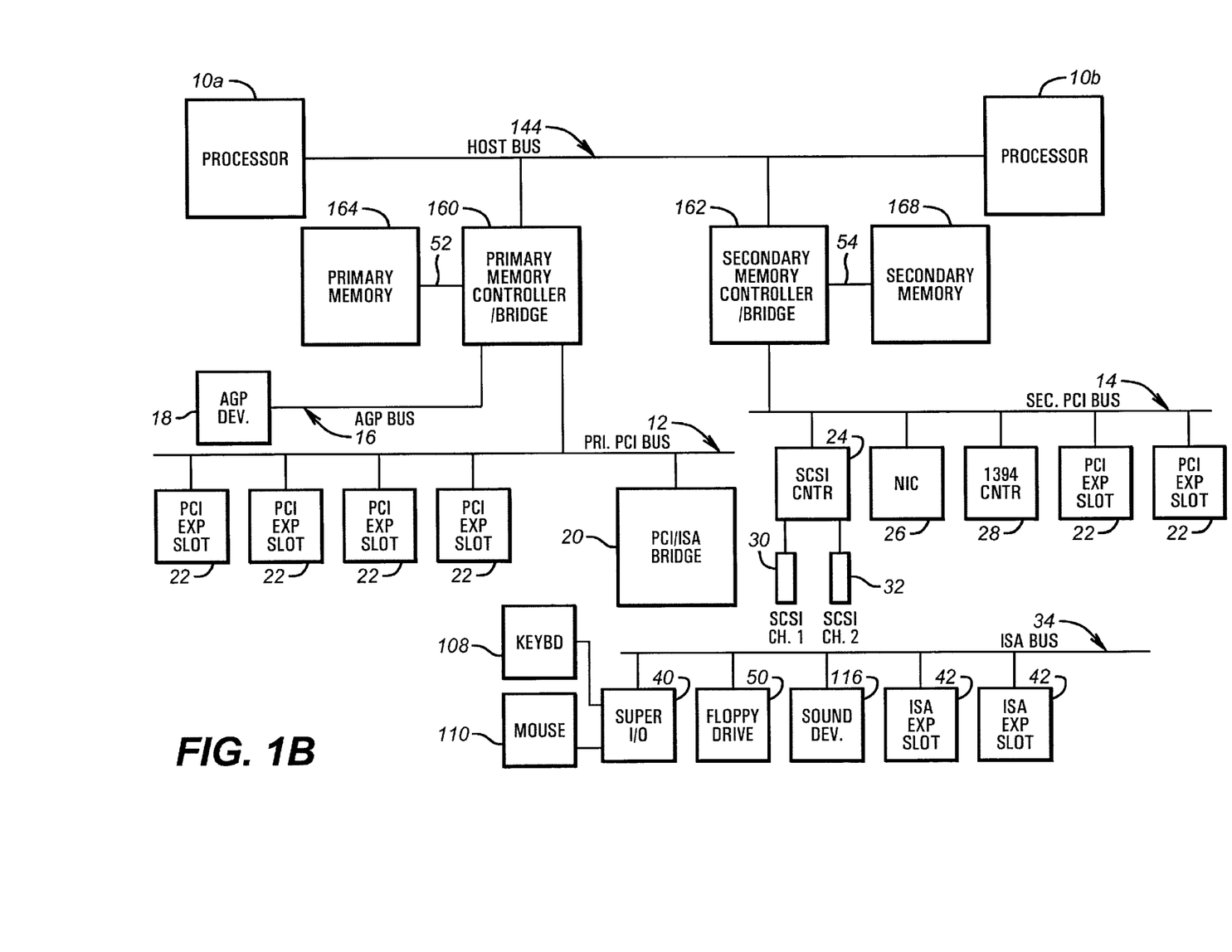
FIG. 1B represents a functional block diagram of a computer system according to the present invention.

Turning now to FIG. 1B, the computer system C according to the embodiment of the present invention is illustrated. The computer system C includes two processors 10a and 10b, such as Intel Pentium®II XEON™ processors, or the like. The processors 10a and 10b are coupled to either end of a host bus 144.

Also coupled to the host bust 144 are a primary memory controller/host-to PCI/APG (advanced graphics port) bridge 160 and a secondary memory controller/host-to-PCI bridge 162. Primary memory controller/host-to-PCI bridge 160 provides address and control signals to primary memory 164 via line 52, and secondary memory controller/host-to-PCI bridge 162 provides address and control signals to secondary memory 168 via line 54. Primary memory 164 and secondary memory 168 can be comprised of a plurality of dynamic random access memory (DRAM) devices (not specifically shown). The primary memory controller/host-to-PCI/APG bridge 164 and secondary memory controller/host-to-PCI bridge 162 translate processor cycles into peripheral component interconnect (PCI) cycles, and vice versa, for connecting to a primary PCI bus 12 and a secondary PCI bus 14, respectively.

Also connected to the primary PCI bus 12 is a PCI/ISA (industry standard architecture) bridge 20, and one or more PCI expansion slots 22. The primary memory controller/host-to-PCI/APG 160 also translates processor cycles into AGP cycles, and vice versa, for connecting to a AGP bus 16. An AGP device 18 is coupled to the AGP bus 16. The AGP device 18 provides the necessary interface to a monitor (not specifically shown).

The PCI/ISA bridge 20 translates PCI cycles to ISA cycles, and vice versa, for connecting to an ISA bus is a sound device 116, a super I/O device 40, and one or more ISA expansion slots 42. A floppy drive 50 is coupled to the super I/O device 40. Also coupled to the super I/O device 40 are the keyboard 108 and the mouse 110. Coupled to the secondary PCI bus 14 are a SCSI (small computer serial interface) controller 24, a NIC (network interface controller) device 26, a 1394 controller (or FIREWIRE) device 28, and one or more PCI expansion slots 22.

Multimedia is a relatively new capability for computer systems. Multimedia refers to the delivery of information that combines different content formats. For example, these different formats may include motion video, audio, still images, graphics, animation and text. With regards to audio, advances in sound devices and loudspeaker technology allow users to enjoy rich sounds. These sounds were once only provided by high end stereo systems. Surprisingly, the first personal computer (PC) did not include a dedicated sound chip in its architecture. The original IBM PC was designed as a business tool, and not as a multimedia machine. Computers after all, were seen as number crunchers. The only sounds necessary were beeps and chimes to serve as warning signals.

In addition to sound devices, loudspeakers have improved in providing quality sounds. As with the first PC, the internal speaker 112 is installed in the CPU 100. For personal listening, the headphone 106 can be connected to the CPU 100. To achieve a fuller sound, external loudspeakers 104 can be connected to the CPU 100.

Typically, the external loudspeakers 104 include audio amplifiers that allow the loudspeakers to provide a fuller richer and louder sound.

In most applications, when the headphone 106 is plugged into CPU 100, no audio from the internal loudspeaker 112 or external loudspeakers 104 should emanate. It is desirable to have the internal loudspeaker 112 and external loudspeakers 104 turn off when the headphone 106 is connected to the CPU 100. In addition, it is desirable to have the internal speaker 112 turn off when the external loudspeakers 104 are connected to the CPU 100.

Figure 2A:
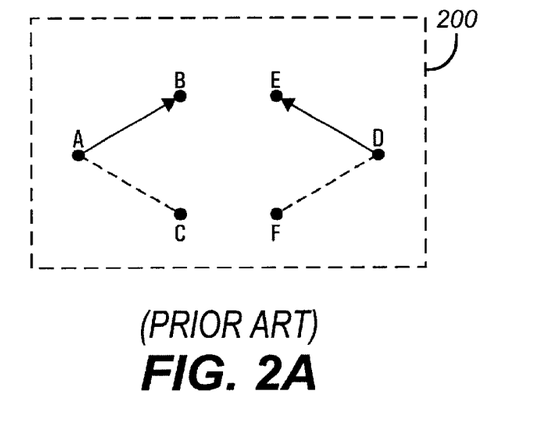
FIG. 2A represents a schematic electrical circuit diagram of a jack used in prior designs.

FIG. 2A represents a schematic diagram of jack switching used in prior designs. When a plug for an audio transducer, such as the headphone is not inserted into the jack 200, pin A is shorted to pin B and pin D is shorted to pin E. When a plug is inserted into the jack 200, pin A is shorted to pin C and pin D is shorted to pin F.

Figure 2B:
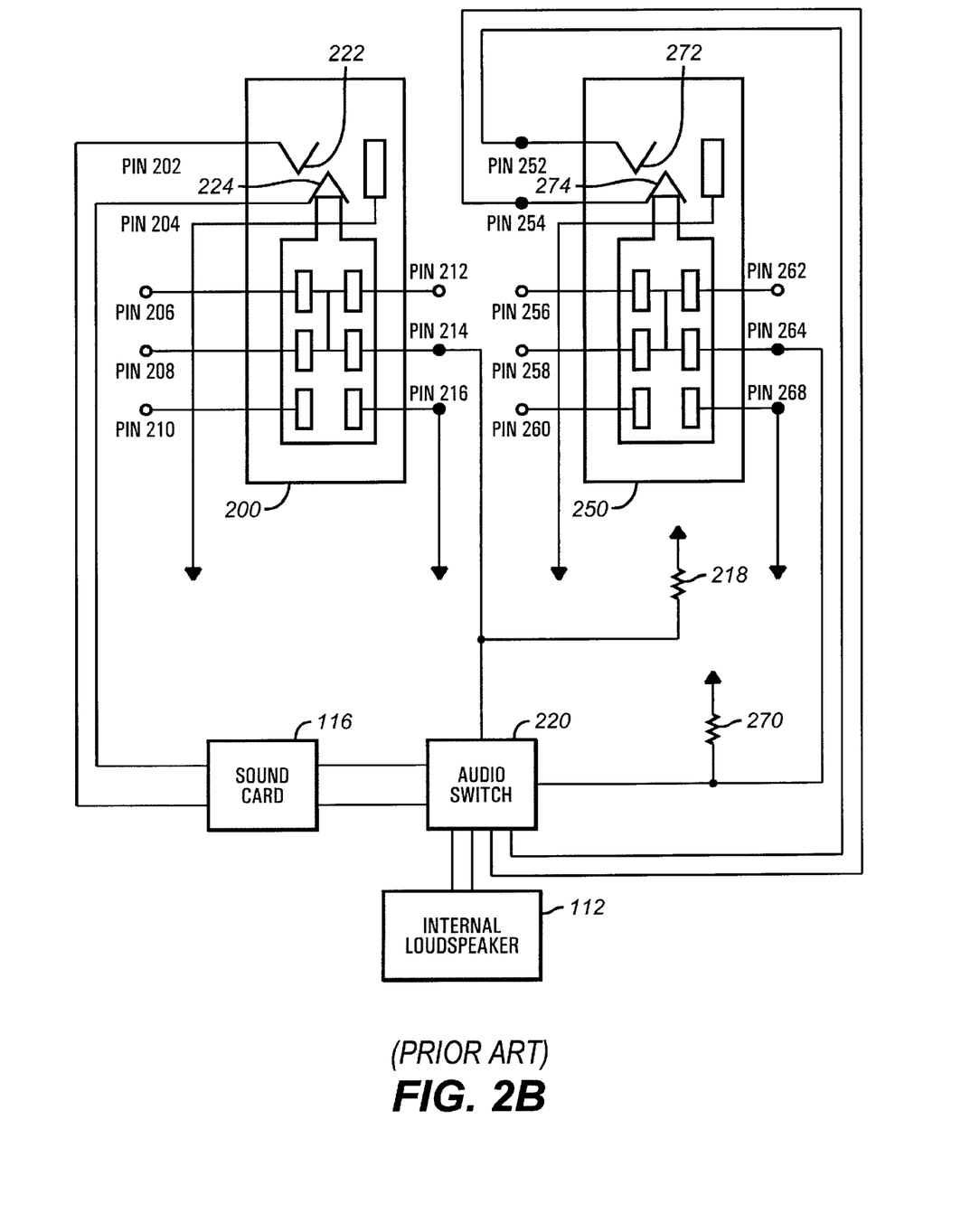
FIG. 2B is a schematic electrical circuit diagram incorporating audio jack/switches used in prior designs.

FIG. 2B is a schematic electrical circuit diagram incorporating audio jack/switches 200 and 250 used in prior designs. The jack/switches 200 and 250 operate according to the switching illustrated in FIG. 2A discussed above. The audio jack/switch 200 includes contacts 222 and 224 for receiving the headphone 106. The audio jack/switch 250 includes contacts 272 and 274 for receiving the external loudspeakers 104. The audio jack/switches 200 and 250 provide the interface between the headphone 106 and external loudspeakers 104 with a sound device 116. A typical sound device for computers is an ESS 1869 audio controller.

Sound device 116 provides the electrical signals to the headphone 106, internal loudspeaker 112, and external loudspeaker 104 depending on the position of jack/switches 200 and 250. The headphone 106, internal loudspeaker 112, and external loudspeakers 104 convert the electrical signals from sound device 116 to sound waves. An audio switch 220 disables the internal loudspeaker 112 when the headphone 106 is connected to jack/switch 200 or when external loudspeakers 104 is connected to jack/switch 250.

Typically, when the headphone 106 is not connected contacts 222 and 224 of jack/switch 200, pin 206 is connected to pin 208, and pin 212 is connected to pin 214. Since pin 212 is not connected to a load, the audio switch 220 senses the voltage across pull-up resistor 218. The audio switch 220 connects the electrical signals from the sound device 116 to the internal loudspeaker 112.

When the headphone 106 is connected to contacts 222 and 224 of jack/switch 200, pin 208 is connected to pin 210, and pin 214 is connected to pin 216. Since pin 216 is connected to ground, the audio switch 220 senses a ground. The audio switch 220 opens and does not connect the electrical signals from the sound device 116 to internal loudspeaker 112.

Likewise, the audio jack/switch 250 includes contacts 272 and 274 for receiving the external loudspeakers 104. Typically, when the external loudspeakers 104 is not connected to contacts 272 and 274 of jack/switch 250, pin 256 is connected to pin 258, and pin 262 is connected to pin 264. Since pin 262 is not connected to a load, the audio switch 220 senses the voltage across pull-up resistor 270. The audio switch 220 closes and connects the electrical signals from the sound device 116 to the internal loudspeaker 112.

When the external loudspeakers 104 are connected to contacts 272 and 274 of jack/switch 250, pin 258 is connected to pin 260, and pin 264 is connected to pin 268. Since pin 268 is connected to ground, the audio switch 220 senses a ground. The audio switch 220 opens and disconnects the electrical signals from the sound device 116 to the internal loudspeaker 112. Furthermore, when the headphone 106 is not connected to contacts 222 and 224 of jack/switch 200, pin 214 is open, and the audio switch 220 senses the voltage across pull-up resistor 218. Next, the audio switch 220 provides the electrical signal from sound device 116 to the external loudspeakers 104 through contacts 272 and 274 of jack/switch 250. When the headphone 106 is connected to contacts 222 and 224 of jack/switch 200, pin 214 is connected to pin 216. Since pin 216 is grounded, the audio switch 220 senses a ground from pin 214. Next, the audio switch 220 disconnects the internal loudspeaker 112 from the sound device 116, and in addition, the audio switch 220 disconnects contacts 272 and 274 of jack/switch 250 from the sound device 116.

Figure 3A:
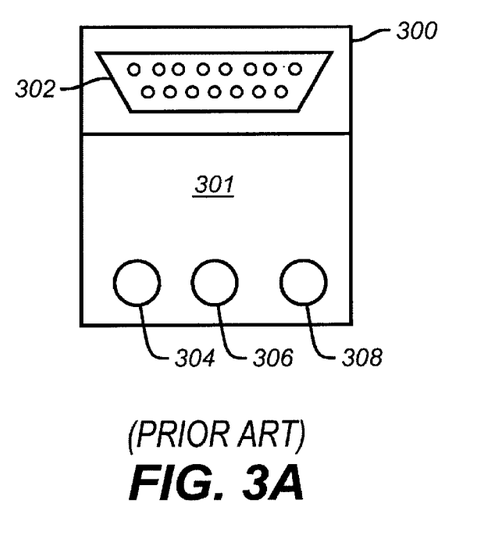
FIG. 3A is a front elevation view of a combination game/MIDI/line-in/line-out/headphone jack (prior art)

FIG. 3A is a frontal elevation view of a combination game/MIDI/line-in/line-out/headphone jack/switch 300, for example, a FOXCONN DM11251-J1 jack/switch, or the like. The combination jack/switch 300 combines the various connectors in one single package. The combination jack/switch is recommended for computer systems by Intel Corporation of Santa Clara, Calif. The combination jack/switch is low cost and may eventually be an industry standard and be used by many computer systems manufacturers. A 15-pin DIN connector 302, and various jacks 304, 306 and 308, all face in the same direction on a front face 301 of combination jack/switch 300.

Figure 3B:
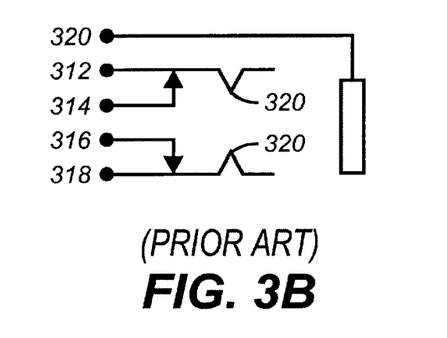
FIG. 3B is a schematic electrical circuit diagram of a combination game/MIDI/line-in/line-out/headphone jack (prior art)

FIG. 3B illustrates a schematic electrical circuit diagram of jack 304 of combination jack/switch 300. As an example, jack 304 can be used as a line-out jack for connecting the external loudspeakers 104 to the sound device 116. When the external loudspeakers 104 are not connected to jack 304 at contacts 320 and 322, pins 312 and 314 are connected. Furthermore, pins 316 and 318 are also connected. When the external loudspeakers 104 are connected to jack 304 at contacts 320 and 322, pins 312 and 314 are not connected, and pins 316 and 318 are not connected.

Figure 4:
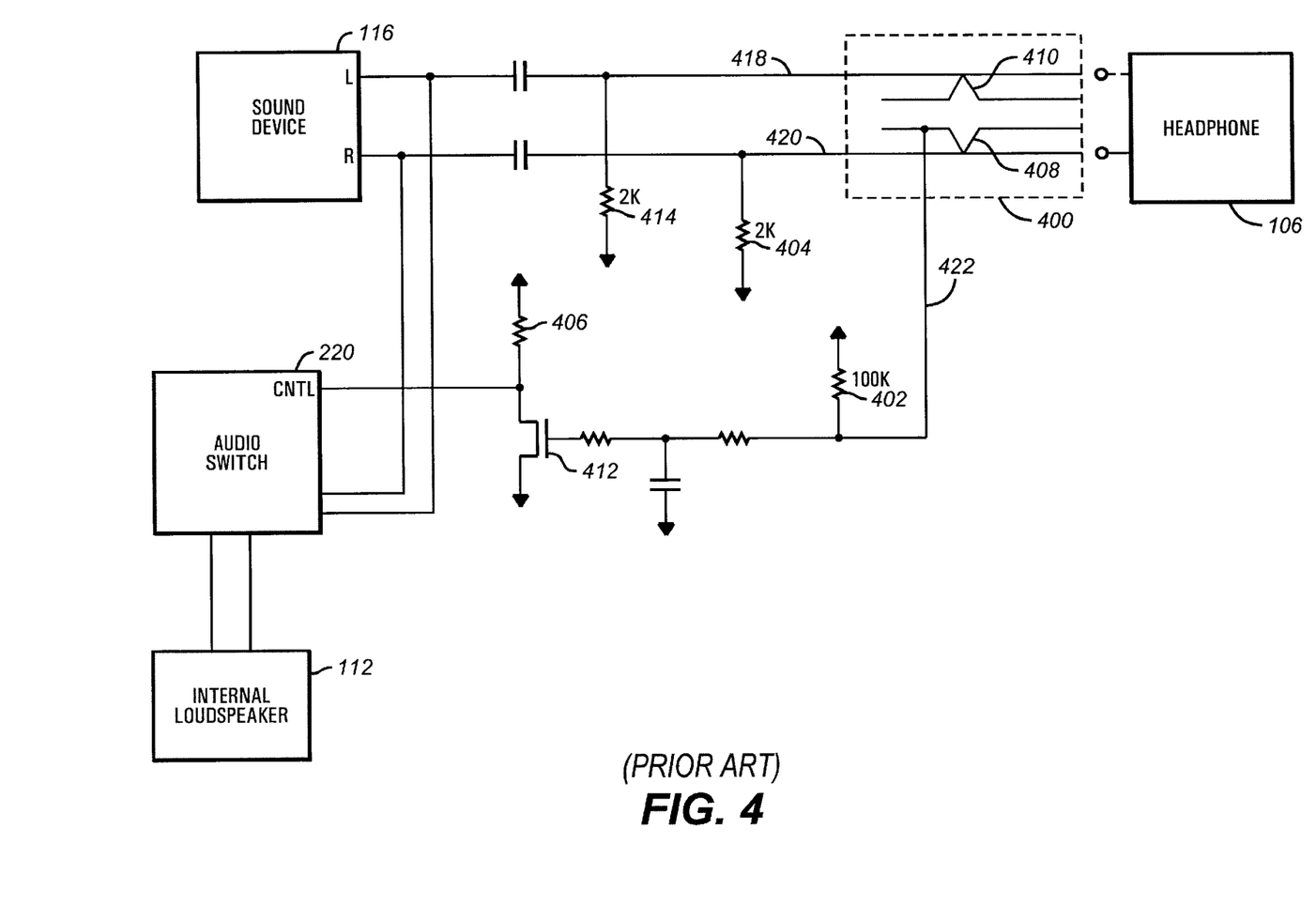
FIG. 4 is a schematic electrical circuit diagram of an audio circuit for routing audio to a headphone (prior art)

FIG. 4 is a schematic electrical circuit diagram illustrating a circuit for routing audio signals to a headphone used in prior designs incorporating a jack/switch with electrical switching characteristics equivalent to the combination jack/switch 300. In addition to accepting the headphone 106, a headphone jack/switch 400 connects the sound device 116 via lines 418 and 420 and a transistor switch 412 via a line 422, which also connects to the audio switch 220. The audio switch 220 also connects to the internal loudspeaker 112.

A voltage divider for transistor switch 412 includes a resistor 402 on line 422 and a resistor 404 on line 420, inserted between the sound device 116 and the headphone jack/switch 400. To insure that the headphone 106 is connected to balanced lines 418 and 420, a resistor 414 on line 418 is used to maintain balance with voltage divider resistor 404 on line 420. When the headphone 106 is not connected to contacts 408 and 410 of the headphone jack/switch 400, line 420 is connected to line 422, and the transistor switch 412 is "off." This provides a logic "1" (or an enabling signal) to a control CNTL input of audio switch 220. Thus, audio switch 220 closes, allowing the electrical signals from the sound device 116 to pass to internal loudspeaker 112 when the headphone 106 is not connected. Typically, the headphone 106 has an 8 ohm impedance.

When headphone 106 is connected to contacts 408 and 410 of headphone jack/switch 400, the headphone jack/switch 400 disconnects lines 420 and 422, and the transistor switch 112 is "on." This provides a logic "0" (or a not enabling signal) to the control CNTL input of audio switch 220 via a pull-up resistor 406. Thus, audio switch 220 opens and disconnects sound device 116 from the internal loudspeaker 112 when the headphone 106 is connected to the headphone jack/switch 400.

The circuit of FIG. 4 thus detects insertion of the headphone 106 into the headphone jack/switch 400. However, the circuit of FIG. 4 is not able to drive the external loudspeakers 104 if a line-out jack with similar switching characteristics were to replace the headphone jack/switch 400. Typical external loudspeakers with audio amplifiers have variable input impedances, usually greater than 100K ohms. Because of the magnitude and range of these variable impedance for different types of audio amplifiers, the circuit of FIG. 4 is not able in some cases to drive the external loudspeakers 104 over the entire impedance range. This is because the impedance of the external loudspeakers 104 would be in parallel with 2k ohm resistors 404 and 414.

Figure 5:
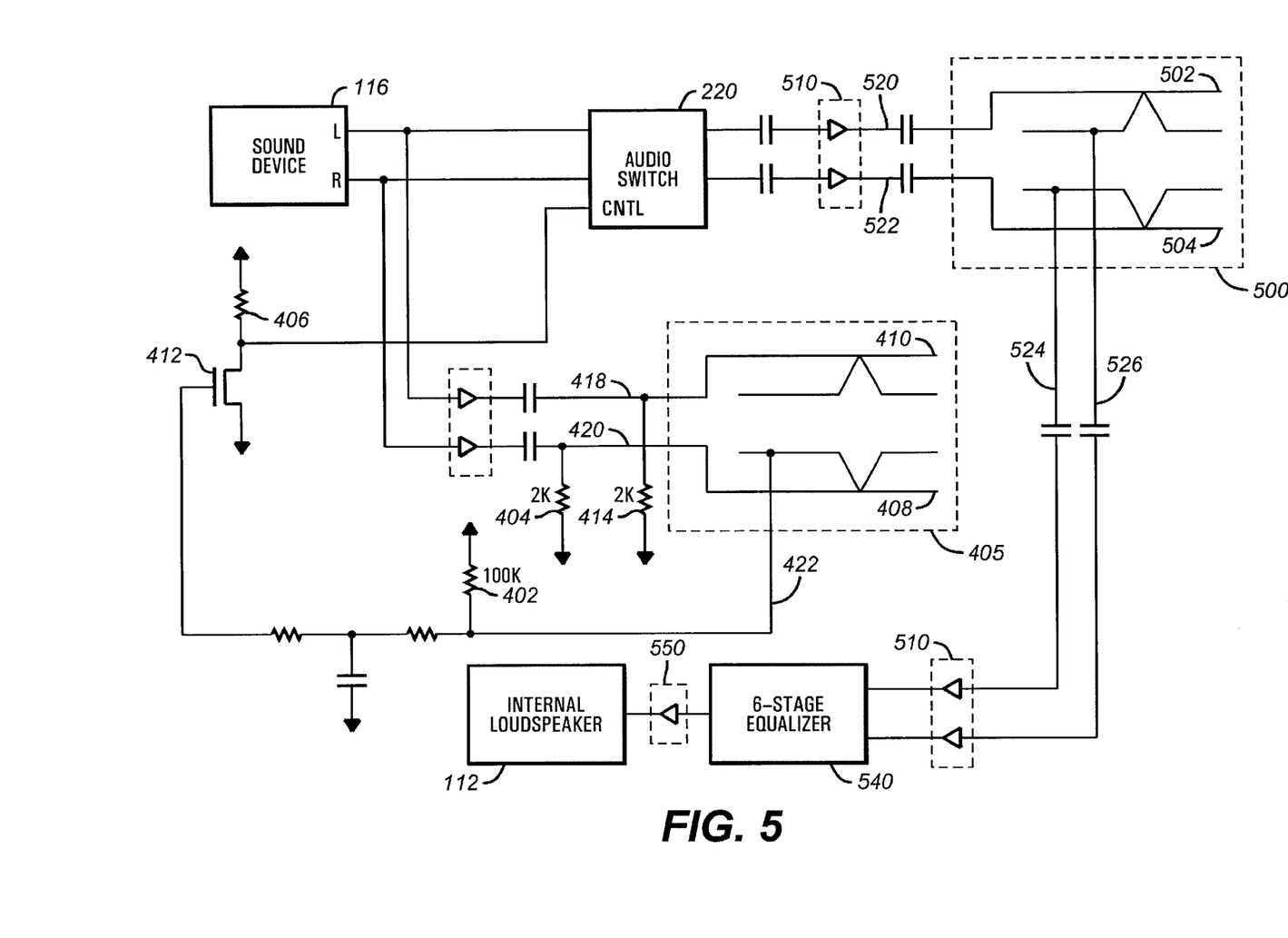
FIG. 5 is a schematic electrical circuit diagram of an audio circuit according to the present invention using a combination game/MIDI/line-in/line-out/headphone jack as a switch for providing an audio signal.

As will be set forth below, the present invention overcomes the foregoing problems. The present invention incorporates the switching characteristics of combination jack 300 to provide the routing of electrical signals from the sound device 116 to various transducers 104, 106 and 112. The desired feature of routing the electrical signals to one transducer and not the others is also maintained. One embodiment according to the present invention for routing audio to the headphone 106 is depicted in FIG. 5. A line-out jack 500 of combination jack 300 (not shown) is connected to the audio switch 220 via lines 520 and 522 and the internal loudspeaker 112 via lines 524 and 526. Unity gain amplifiers 510 used as buffers are inserted between the audio switch 220 and the line-out jack 500 and between the line-out jack 500 and the internal loudspeaker 112.

When the headphone 106 is connected to the contacts 408 and 410 of headphone jack/switch 405, the headphone jack/switch 400 disconnects lines 420 and 422, and causes the transistor switch 412 to be "on". When the transistor switch 412 is "on", the transistor switch 412 does not provide the enabling signal to the CNTL input of audio switch 220. Next, audio switch 220 opens and disconnects the electrical audio signals out of sound device 116 with line-out jack 500 and internal loudspeaker 112. When the headphone 106 is not connected to contacts 408 and 410 of the headphone jack/switch 405, line 420 is connected to line 422, and the transistor switch 412 is "off." This provides a logic "1" (or an enabling signal) to a control CNTL input of audio switch 220. Then audio switch 220 closes and connects the sound device 116 with the line-out jack 500. Thus when the external loudspeakers 104 are not connected to the line-out jack 500, the line-out jack 500 couples the sound device 116 through audio switch 220 via lines 520 and 522 with a 6 stage equalizer 540 via lines 524 and 526. The 6 stage equalizer 540 is connected to an amplifier 530. The amplifier 550 is connected to the internal loudspeaker 112. One of the functions of the 6 stage equalizer 540 is to combine the electrical signals from lines 524 and 526 and provides a single electrical signal to amplifier 550 for signal amplification. The single electrical signal is then provided to the internal loudspeaker 112.

When the external speakers 104 are connected to contacts 502 and 504 of line-out jack 500, the line-out jack 500 connects the electrical signals from the audio switch 220 to the external loudspeakers 104 via lines 520 and 522. In addition, the line-out jack 500 opens and disconnects the electrical signals from the audio switch 220 to the 6 stage equalizer 540 via lines 520 and 522 with lines 524 and 526.

In this embodiment, a switching mechanism for connecting/disconnecting the sound device 116 with the internal loudspeaker 104 is the mechanical making and breaking of line 520 with line 526 and line 522 with line 524, by line-out jack 500. The switching mechanism couples line 520 with line 526 and line 522 with line 524, when the external loudspeakers 104 are not plugged into line-out jack 500. The switching mechanism decouples line 520 with line 526 and line 522 with line 524 when the external loudspeakers 104 are plugged into line-out jack 500.

Figure 6:
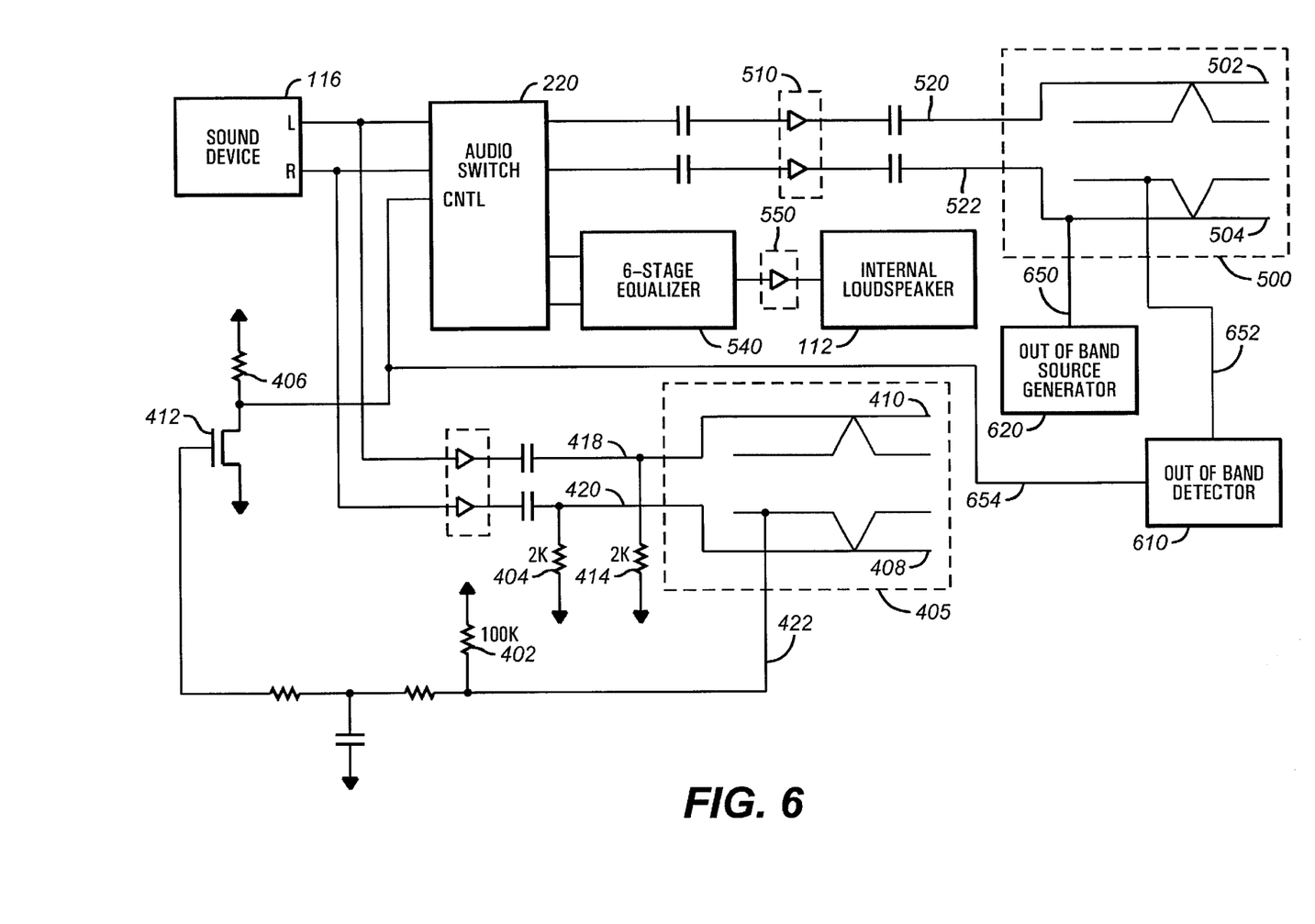
FIG. 6 is a schematic electrical circuit diagram for another switching system according to the present invention, providing an out of band signal through a combination game/MIDI/line-in/line-out/headphone jack.

Next, FIG. 6 illustrates a schematic diagram of another switching circuit embodiment according to the present invention. This switching occurs through the formation of an out of band (ultrasonic) source generator and detector. As discussed above, the audio switch 220 connects the sound device 116 with the internal loudspeaker 112 when the headphone 106 is not connected to the headphone jack/switch 405. In addition, when the headphone 106 is not connected to the headphone jack/switch 405, the audio switch 220 connects the sound device 116 to the line-out jack 500.

When the headphone 106 is connected to the headphone jack/switch 400, the transistor switch 412 is "on" due to a pull up transistor 402. The transistor switch 412 does not provide an enabling signal to the CNTL input of the audio switch 220.

Therefore the audio switch 220 opens and disconnects the sound device 116 with the line-out jack 500 and the sound device 116 with the internal loudspeaker 112.

Out of band or ultrasonic, as has been noted, refers to frequencies higher than the highest audio frequency generated by sound device 220. A typical audio signal outputted by sound device 116 has a frequency range between 10 to 20 kHz. As an example, the ultrasonic frequency can be greater than or equal to 30 kHz.

The audio switch 220 is connected to the line-out jack 500 via lines 520 and 522. An out of band source generator 620 is connected to line 522 by line 650. An out of band detector 610 is connected to the line-out jack 500 via line 652. The out of band source generator 620 provides an ultrasonic signal with the same frequency to be detected by the out of band detector 610. When the external loudspeakers 104 are not connected to contacts 502 and 504 of line-out jack 500, the line-out jack 500 connects lines 522 and 652. The out of band detector 610 senses the ultrasonic signal from the out of band source generator 620. When the out of band detector 610 senses the ultrasonic signal, the out of band detector 610 provides an enabling signal via line 654 to the CNTL input of audio switch 220. With the audio switch 220 enabled, the audio switch 220 connects the electrical signal from the sound device 116 to a 6 stage equalizer 540 via lines 524 and 526. The 6 stage equalizer 540 is connected to an amplifier 530. The amplifier 550 is connected to the internal loudspeaker 112. As discussed previously, the 6 stage equalizer 540 combines the electrical signals from lines 524 and 526 and provides a single electrical signal to amplifier 550 for signal amplification. The single electrical signal is then provided to the internal loudspeaker 112.

When the external loudspeakers 104 are connected into contacts 502 and 504 of the line-out jack 500, the line-out jack 500 opens and lines 522 and 652. Thus the out of band detector 610 does not detect the ultrasonic signal from the out of band source generator 620. The out of band detector 610 thus does not provide an enabling signal to the CNTL input of audio switch 220. The audio switch 220 opens and disconnects the sound device 116 with the internal loudspeaker 112. The audio switch 220 continues to connect the sound device 116 with the line-out jack 500 which is also coupled to the external loudspeakers 104 at contacts 502 and 504.

In this embodiment, the switching mechanism for connecting/disconnecting the sound device 116 with the internal loudspeaker 104 is the presence or non-presence of the ultrasonic signal being detected by the out of band detector 610. When the external loudspeakers 104 are not plugged into line-out jack 500, the switching mechanism enables the audio switch 220 to provide the electrical signals from the sound device 116 to the internal loudspeaker 112. When the external loudspeakers 104 are plugged into line-out jack 500, the switching mechanism does not enable the audio switch 220 and therefore the audio switch 220 does not provide the electrical signals from the sound device 116 to the internal loudspeaker 112.

Thus, according to the present invention, the audio circuit is impervious to load impedances. Prior designs, as illustrated in FIG. 4, include a finite value resistor in parallel with the transducer. Therefore, this finite value resistor may effectively short out the transducer, when the transducer's impedance is greater than the finite value resistor. For example, typically a transducer such as external loudspeakers have variable impedances greater than 100k ohms. In prior designs, the finite value resistor (2k ohm resistor 404 in FIG. 4) would effectively short out the external loudspeaker. The present invention does not incorporate this finite value resistor. Therefore, the invention is impervious to a transducer's impedance regardless of its value or range of values.

As has been set forth, the present invention provides the desired audio switching capabilities many users have been accustomed to and does so in a manner compatible with the recently proposed combination switch, such as the FOXCONN DM11251-J1, or the like.

The foregoing disclosure and description of the invention are illustrative and explanatory thereof, and various changes in the details of the illustrated apparatus and construction and method of operation may be made without departing from the spirit of the invention.

What is claimed is:

1. A computer system, comprising:
   a processor;
   an audio source for providing audio signals under control of the processor;
   a first audio transducer having a first connecting plug;
   a second audio transducer having a second connecting plug;
   an audio connector jack coupled to a third audio transducer and said audio source; said audio connector jack capable of coupling said first audio transducer with said audio source and capable of coupling said second audio transducer with said audio source;
   a switching mechanism for coupling said first audio transducer to said audio source and decoupling said audio connector jack with said second audio transducer and decoupling said audio source with said third transducer, when said audio connector jack receives said first connecting plug; and
   said switching mechanism coupling the audio source to said second audio transducer and decoupling said audio source with said third transducer when said audio connector jack receives said second connecting plug.

2. The computer system of claim 1 wherein said switching mechanism sends an electrical signal to couple said second audio transducer when said audio connector jack receives said second connecting plug.

3. The computer system of claim 1 wherein said switching mechanism mechanically connects said audio source with said second audio transceiver when said audio connector jack does not receive said connecting plug.

4. The computer system of claim 1 wherein said first audio transducer is an external loudspeaker.

5. The computer system of claim 1 wherein said audio source is a sound device.

6. The computer system of claim 5 wherein said sound device is an ESS 1869 audio controller.

7. The computer system of claim 1 wherein said first audio transducer has a variable resistance greater that 100k ohms.

8. The computer system of claim 1 wherein said audio connector jack is a combination jack.

9. The computer system of claim 8 wherein said combination jack is a FOXCONN DM11251-J1.

10. The computer system of claim 1 wherein said third audio transducer is an internal loudspeaker.

11. The computer system of claim 1 wherein said switching mechanism is an integral component of said audio connector jack.

12. A computer system, comprising:

a processor;

an audio source for providing audio signals under control of the processor;

a first audio transducer having a connecting plug;

an audio connector jack for coupling said connecting plug of said first audio transducer with said audio source;

an out of band source generator coupled to said audio connector jack;

an out of band detector coupled to said audio connector jack;

a first switching mechanism for coupling said first audio transducer to said audio source and decoupling said out of band source generator with said out of band detector when said audio connector jack receives said connecting plug;

said first switching mechanism coupling said out of band source generator with said out of band detector when said audio connector jack does not receive said connecting plug;

a second switching mechanism for coupling said audio source with a second audio transducer when said out of band source generator is coupled with said out of band detector; and said second switching mechanism decoupling said audio source to said second audio transducer when said out of band source generator is decoupled with said out of band detector.

13. The computer system of claim 12 wherein said first audio transducer is an external loudspeaker.

14. The computer system of claim 12 wherein said audio source is a sound device.

15. The computer system of claim 14 wherein said sound device is an ESS 1869 audio controller.

16. The computer system of claim 12 wherein said first audio transducer has a variable resistance greater that 100k ohms.

17. The computer system of claim 12 wherein said audio connector jack is a combination jack.

18. The computer system of claim 17 wherein said combination jack is a FOXCONN DM11251-J1.

19. The computer system of claim 12 wherein the out of band source generator provides a ultrasonic signal and out of band detector switch detects said ultrasonic signal.

20. The computer system of claim 19 wherein said ultrasonic signal has a frequency of 30 kHz.

21. The computer system of claim 12 wherein said second audio transducer is an internal loudspeaker.

22. The computer system of claim 12 wherein said switching mechanism is an integral component of said audio connector jack.

23. The computer system of claim 1 wherein said second audio transducer is a headphone.

* * * * *